(12) United States Patent
Walther et al.

(10) Patent No.: US 6,379,004 B1
(45) Date of Patent: Apr. 30, 2002

(54) OPHTHALMIC LENS AND PROCESS FOR ITS PRODUCTION

(75) Inventors: Marten Walther, Engelstadt; Michael Spallek, Ingelheim; Manfred Borens, Woerrstadt; Wolfgang Moehl, Worms; Markus Kuhr, Woellstein, all of (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/599,731

(22) Filed: Jun. 23, 2000

(30) Foreign Application Priority Data

Jun. 24, 1999 (DE) .......................... 199 28 888

(51) Int. Cl.$^7$ ................................. G02C 7/02
(52) U.S. Cl. ........................ 351/166; 351/177
(58) Field of Search .................. 351/166, 159, 351/177, 44, 41; 427/412.1, 412.3; 428/516; 264/1.1, 1.7, 1.8, 2.7

(56) References Cited

U.S. PATENT DOCUMENTS

| | | | |
|---|---|---|---|
| 4,632,844 A | 12/1986 | Yanagihara et al. | 427/488 |
| 5,087,677 A | 2/1992 | Brekner | 526/160 |
| 5,300,558 A * | 4/1994 | Kurisu et al. | 524/707 |
| 5,905,129 A * | 5/1999 | Murakami et al. | 526/281 |
| 6,183,829 B1 * | 2/2001 | Daecher et al. | 428/64.1 |

FOREIGN PATENT DOCUMENTS

| | | |
|---|---|---|
| EP | 0152256 | 8/1985 |
| EP | 0407870 A3 | 1/1991 |
| EP | 0407870 A2 | 1/1991 |

OTHER PUBLICATIONS

Patent Abstracts of Japan vol. 018, No. 688 (p.–1849) & JP 06 273701 (Sep. 30, 1994).
Patent Abstracts of Japan vol. 017, No. 681 (p.–1660) & JP 05 225613 (Sep. 3, 1993).

* cited by examiner

*Primary Examiner*—Jordan M. Schwartz
(74) *Attorney, Agent, or Firm*—Millen, White, Zelano & Branigan, P.C.

(57) ABSTRACT

This invention relates to optical, preferably ophthalmic lenses with a body made of plastic, in particular for spectacle glasses, and the plastic incorporates cycloolefinic polymers and the plastic body is coated with a transparent coating resistant to corrosion. Another object of this invention is a process for the production of these lenses. The lenses according to the invention are especially resistant to greases, sweat and/or solvents.

26 Claims, No Drawings

OPHTHALMIC LENS AND PROCESS FOR ITS PRODUCTION

This invention relates to optical, preferably ophthalmic lenses, with a body made of plastic, in particular for spectacle glasses and a process for their production.

Traditional optical special-purpose glasses are used as materials for optical lenses, in particular for eyeglass lenses. For this purpose a whole series of optical glass types with varying optical properties are available. Details are summarized in the overview articles of T. Jarratt (Optical World, May 1998, pp. 10–27 and Optical World, March 1998, pp 10–23).

To avoid thick edge areas in eyeglasses, special glass types were developed that have higher refractive indices. At given optical strengths these types make it possible for the glasses to be able to be made thinner. To achieve lighter eyeglass lenses, more recently plastics have also been used for ophthalmic applications.

The advantages and drawbacks of mineral glasses compared to plastic glasses have been explicitly described by A. Asseraf (Optical World November 1997, pp. 12–15) and by Richard Chaffin (Optical World, February 1997, pp 35–38). With plastics, the advantage in particular is high mechanical strength and low specific weight.

Up to now, polycarbonates, polyurethanes, and special-purpose plastics, such as, e.g., CR 39, and their modifications were used as plastics for optical lenses, in particular eyeglass lenses. In using them, in addition to the optical qualities of these plastics, their resistance to chemicals, such as, e.g., cleaning agents, and their scratch resistance were decisive.

CR 39, a copolymer made of diethyleneglycol and bisallylcarbonate, is a special-purpose plastic for optical lenses, in particular spectacle glasses, that has good optical properties. The refractive index is 1.498 at an Abbe number of 58. The Abbe number is a very important material property since it describes the optical dispersion. Only at Abbe numbers greater than 40 will the eyeglass wearer not normally notice any disturbing rings of color.

But CR 39, with 1.32 $g/cm^3$, has quite a great density, which is especially noticeable in its heavy weight at glass strengths up to 6 diopters. Also a drawback with CR 39 is the processability. CR 39 must be produced by a casting process and subsequent UV curing typical for non-thermoplastic plastics. For this purpose, the casting resin is poured into a mold consisting of two ground silicate glasses kept together by a ring and then is cured by UV light.

With a density of 1.20 $g/cm^3$ and a refractive index of 1.568, polycarbonate as a plastic for spectacle glasses has advantages compared to CR 39. For example, a round lens with a diameter of 55 mm and a strength of −8 diopters made of polycarbonate weighs 12.0 g. In contrast, a lens with an identical strength made of CR 39 weighs 15.8 g. In any case, the Abbe number of only 30.0 is an essential drawback of polycarbonate, so that the use of polycarbonate is considerably limited.

Consequently, thermoplastic plastics that have a density less than 1.20 $g/cm^3$, a refractive index greater than 1.500 and an Abbe number greater than 40 are necessary to fulfill the requirements of eyeglass lenses.

Materials with a refractive index between 1.520 and 1.545 are known from EP 047 870 A2 that can also be used for optical applications. But they involve only applications in which oil and grease resistance play no role. This drawback completely precludes their use as plastic for eyeglass lenses, since contact with a grease-containing hand sweat, grease-containing skin-care products, solvent-containing cleaning agents (ethanol, propanol, among others) cannot be precluded.

Likewise there is a description of these plastics for optical applications in EP 0 485 893 A1 on page 11, lines 35–43 and in EP 0 610 851 B1. A similar material is described in JP 90009619-B (Mar. 2, 1990), Nippon Zeon. These materials also are not suited for ophthalmic uses because of insufficient grease resistance.

Other plastics with a density of less than 1.2 $g/cm^3$ are the known polyolefins, polyethylene, polypropylene and their copolymers. But these materials are semi-crystalline materials and thus have insufficient transparency for ophthalmic applications.

It is true that poly-4-methylpentene-1 ("PMP" from Mitsui Petrochemical) again has sufficient transparency and low density, but the optical properties are insufficient by far, thus, e.g., the refractive index at 600 nm with 1.4655 is far too low (H. Domininghaus, Die Kunstoffe und ihre Eigenschaften [Plastics and their properties], 1992, page 162).

Considering the prior art indicated and discussed above, the object of this invention was to make available optical lenses, in particular ophthalmic lenses, with a body made of plastic and outstanding optical properties.

Further, the plastic used for production of the lens according to the invention is to be molded according to thermoplastic processes.

Another object of the invention was to make available a lens whose weight at a given diopter is as light as possible.

Further, the lenses were to be resistant to sweat, grease, solvents in cleaning agents, etc.

These objects and others, which in fact are not literally named but can be obviously derived from the relationships discussed here or necessarily come out of them, were achieved by an optical lens with all the features of claim 1. Thus the invention involves an optical lens with a body made of plastic, in particular for spectacle glasses, characterized in that the plastic incorporates cycloolefinic polymers and the plastic body is coated with a transparent coating resistant to corrosion that has at least two layers, namely one inner interface layer facing the plastic and a grease protection layer.

Suitable modifications of the lens according to the invention are detailed below. The achievement of the object with respect to the process for production of a lens is made available by the provision of a process for production of a lens as above, characterized in that a plastic body incorporating cycloolefinic polymers is coated with a transparent coating resistant to corrosion.

Having the plastic include cycloolefinic polymers and coating the plastic body with a transparent, corrosion-resistant coating incorporating at least two layers, one inner interface layer facing the plastic and one grease protection layer, make available an optical, in particular ophthalmic lens with a body made of plastic, in particular for spectacle glasses, that has outstanding optical properties and high resistance to corrosion.

The following advantages are achieved by the measures according to the invention:

Lenses according to the invention have high Abbe numbers and high refractive indices.

The production of plastic bodies for the lenses according to the invention can be performed by simple thermoplastic processes at high speed and are able to be highly automated, such as, e.g., injection molding.

The lenses of this invention are insensitive to greases and cleaning agents such as, e.g., ethanol and isopropanol.

The weight of the lenses according to the invention is very light for the given shape.

Processes known in the art can be used to produce the lenses.

The object according to the invention involves an optical lens that can be used wherever optical lenses can be used, e.g., in objectives, cameras, optical devices or eyeglasses.

The especially preferred application is ophthalmic.

The plastic to be used to produce the lens body according to the invention has cycloolefinic polymers. Cycloolefinic polymers are, in the context of the invention, polymers that can be obtained using cyclic olefins, in particular polycyclic olefins.

Cyclic olefins include, e.g., monocyclic olefins, such as cyclopentene, cyclopentadiene, cyclohexene, cycloheptene, cyclooctene and alkyl derivatives of these monocyclic olefins with 1 to 3 carbon atoms, like methyl, ethyl, or propyl, such as, e.g., methylcyclohexene or dimethylcyclohexene, as well as acrylate- and/or methacrylate derivatives of these monocyclic compounds. Further, cycloalkanes with olefinic side chains can be used as cyclic olefins, such as, e.g., cyclopentylmethacrylate.

Bridged polycyclic olefin compounds are preferred. These polycyclic olefin compounds can have the double bond in the ring, these involve bridged polycyclic cycloalkenes, as well as in the side chains. The latter involve vinyl derivatives, allyloxycarboxy derivatives and (meth)acryloxy derivatives of polycyclic cycloalkane compounds. These compounds can further have alkyl-, aryl-, or aralkyl substituents.

Nonlimiting examples of polycyclic compounds are bicyclo[2.2.1]hept-2-ene (norbornene), bicyclo[2.2.1]hepta-2,5-diene (2,5-norbornadiene), ethylbicyclo[2.2.1]hept-2-ene (ethylnorbornene), ethylidenebicyclo[2.2.1]hept-2-ene (ethylidene-2-norbornene), phenylbicyclo[2.2.1]hept-2-ene, bicyclo[4.3.0]nona-3,8-diene, tricyclo[4.3.0.1$^{2,5}$]-3-decene, tricyclo[4.3.0.1$^{2,5}$]-3,8-decene-(3,8-dihydrodicyclopentadiene), tricyclo[4.4.0.1$^{2,5}$]-3-undecene, tetracyclo[4.4.0.1$^{2,5}$,1$^{7,10}$]-3-dodecene, ethylidene-tetracyclo[4.4.0.1$^{2,5}$.1$^{7,10}$]-3-dodecene, methyloxycarbonyltetracyclo[4.4.0.1$^{2,5}$,1$^{7,10}$]-3-dodecene, ethylidene-9-ethyltetracyclo[4.4.0.1$^{2,5}$,1$^{7,10}$]-3-dodecene, pentacyclo[4.7.0.1$^{2,5}$,0,0$^{3,13}$,1$^{9,12}$]-3-pentadecene, pentacyclo[6.1.1$^{3,6}$.0$^{2,7}$.0$^{9,13}$]-4-pentadecene, hexacyclo[6.6.1.1$^{3,6}$.1$^{10,13}$.0$^{2,7}$.0$^{9,14}$]-4-heptadecene, dimethylhexacyclo[6.6.1.1$^{3,6}$.1$^{10,13}$.0$^{2,7}$.0$^{9,14}$]-4-heptadecene, bis(allyloxycarboxy)tricyclo[4.3.0.1$^{2,5}$]-decane, bis(methacryloxy)tricyclo[4.3.0.1$^{2,5}$]-decane, bis(acryloxy)tricyclo[4.3.0.1$^{2,5}$]-decane.

The cycloolefinic polymers are produced using at least one of the above-described cycloolefinic compounds, in particular the polycyclic hydrocarbon compounds. Further, in producing the cycloolefinic polymers, other olefins can be used that can be copolymerized with the above-mentioned cycloolefinic monomers. To this group belong, among others, ethylene, propylene, isoprene, butadiene, methylpentene, styrene, and vinyltoluene.

Most of the above-mentioned olefins, in particular also the cycloolefins and the polycycloolefins, can be obtained commercially. Further, many cyclic and polycyclic olefins can be obtained by Diels-Alder addition reactions.

The production of cycloolefinic polymers can be performed in a way known in the art, as it is represented in, among others, Japanese patents 11818/1972, 43412/1983, 1442/1986 and 19761/1987 and Japanese laid-open specifications number 75700/1975, 129434/1980, 127728/1983, 168708/1985, 271308/1986, 221118/1988 and 180976/1990 and in European patent applications EP-A-0 6 610 851, EP-A-0 6 485 893, EP-A-0 6 407 870 and EP-A-0 6 688 801.

Cycloolefinic polymers can be polymerized in a solvent, for example, using aluminum compounds, vanadium compounds, wolfram compounds or boron compounds as catalysts.

It is assumed that the polymerization can be performed according to the conditions, in particular the catalyst used, using ring opening or opening of the double bond.

Further, it is possible to obtain cycloolefinic polymers by radical polymerization, where light or an initiator is used as the radical former. This applies in particular for the acryloyl derivatives of cycloolefins and/or cycloalkanes. This type of polymerization can be performed in solution as well as in substance.

To produce the plastic material according to the invention, especially preferably a polycyclic olefin of formula I, II, II or IV, preferably a cycloolefin of formulas I or III,

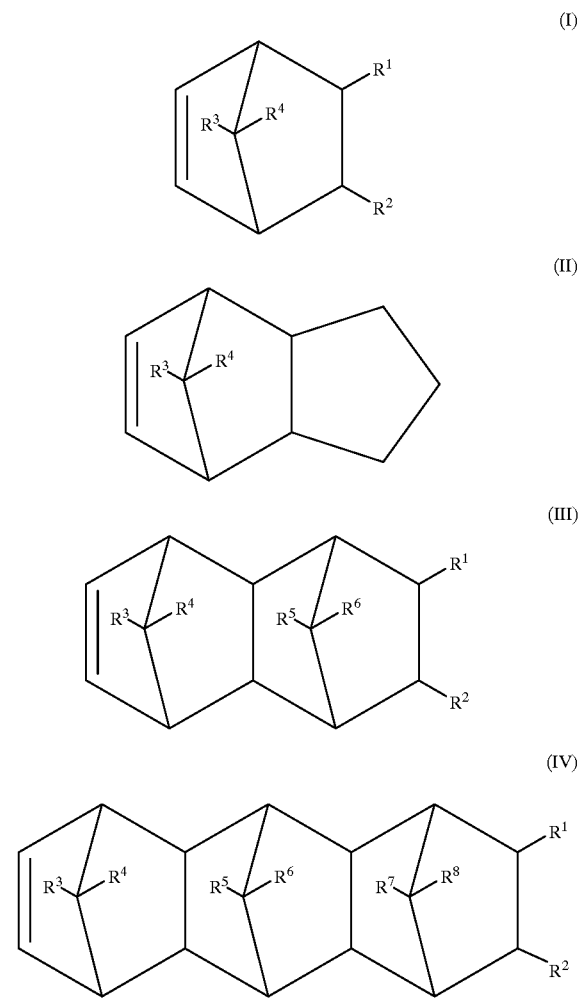

in which $R^1$, $R^2$, $R^3$, $R^4$, $R^5$, $R^6$, $R^7$, and $R^8$ are the same or different and mean a hydrogen atom or a $C_1$–$C_8$ alkyl radical, and the same radical in different formulas can have a different meaning, is polymerized.

Optionally a monocyclic olefin of formula V

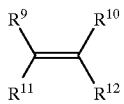

(V)

in which n is a number from 2–10 is also used. Another comonomer is an acyclic 1-olefin of formula VI

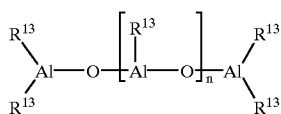

(VI)

in which $R^9$, $R^{10}$, $R^{11}$, and $R^{12}$ are the same or different and mean a hydrogen atom or a $C_1$–$C_8$ alkyl radical. Ethylene or propylene are preferred.

Especially preferably, copolymers of polycyclic olefins of formula I and III are produced. Polycyclic olefin (I–IV) is used in an amount of 0.1–100% by weight, monocyclic olefin (V) is used in an amount of 0–99% by weight, and acyclic 1-olefin (VI) is used in an amount of 0–99.9% by weight in each case relative to the total amount of monomer.

Especially preferred catalysts consist of an aluminumoxane of formula VII for the linear type

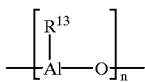

(VII)

and/or of formula VIII for the cyclic type

(VIII)

and at least one metallocene of formula IX

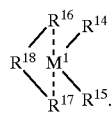

(IX)

In formula IX, $M^1$ is a metal from the group titanium, zircon, hafnium, vanadium, niobium, and tantalum, preferably zircon and hafnium. $R^{14}$ and $R^{15}$ are the same or different and mean a hydrogen atom, a $C_1$–$C_{10}$, preferably a $C_1$–$C_3$-alkyl group, a $C_1$–$C_{10}$, preferably a $C_1$–$C_3$-alkoxy group, a $C_6$–$C_{10}$, preferably a $C_6$–$C_8$-aryl group, a $C_6$–$C_{10}$, preferably a $C_6$–$C_8$-aryloxy group, a $C_2$–$C_{10}$, preferably a $C_2$–$C_4$-alkenyl group, a $C_7$–$C_{40}$, preferably a $C_7$–$C_{10}$-arylalkyl group, a $C_7$–$C_{40}$, preferably a $C_7$–$C_{12}$-alkylaryl group, a $C_8$–$C_{40}$, preferably a $C_8$–$C_{12}$-arylalkenyl group, or a halogen atom, preferably chlorine.

$C_{16}$ and $C_{17}$ are the same or different and mean a one- or polynuclear hydrocarbon radical that can form a sandwich structure with central atom $M^1$. Preferably, $R^{16}$ and $R^{17}$ are either both indenyl or tetrahydroindenyl or $R^{16}$ is fluoroenyl and $R^{17}$ is cyclopentadienyl.

$R^{18}$ is a one- or polyelement bridge that links radicals $R^{16}$ and $R^{17}$ and means

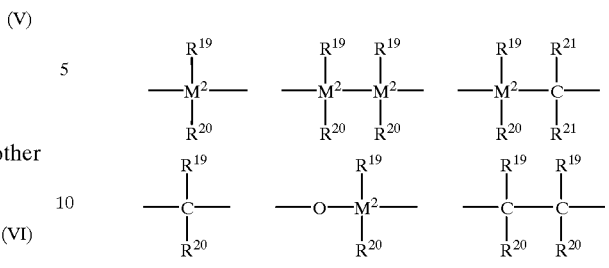

=$BR^{19}$, =$ALR^{19}$, —Ge—, —Sn—, —O—, —S—, =SO, =$SO_2$, =$NR^{19}$, =CO, =$PR^{19}$ or =$P(O)R^{19}$, and $R^{19}$, $R^{20}$, and $R^{21}$ are the same or different and mean a hydrogen atom, a halogen atom, preferably chlorine, a $C_1$–$C_{10}$, preferably a $C_1$–$C_3$ alkyl group, in particular a methyl group, a $C_1$–$C_{10}$ fluoroalkyl group, preferably a $CF_3$ group, a $C_6$–$C_{10}$ fluoroaryl group, preferably a pentafluorophenyl group, a $C_6$–$C_{10}$, preferably a $C_6$–$C_8$ aryl group, a $C_1$–$C_{10}$, preferably a $C_1$–$C_4$ alkoxy group, in particular a methoxy group, a $C_2$–$C_{10}$, preferably a $C_2$–$C_4$ alkenyl group, a $C_7$–$C_{40}$, preferably a $C_7$–$C_{10}$ arylalkyl group, a $C_8$–$C_{40}$, preferably a $C_8$–$C_{12}$ arylalkenyl group or a $C_7$–$C_{40}$, preferably a $C_7$–$C_{12}$ alkylaryl group, or $R^{19}$ and $R^{20}$ or $R^{19}$ and $R^{21}$ together form a ring with the atoms connecting them.

$M^2$ silicon, germanium, or tin, preferably silicon or germanium. $R^{18}$ is preferably =$R^{19}C^{20}$, =$SiR^{19}R^{20}$, =$GeR^{19}R^{20}$, —O——S—, =SO, =$PR^{19}$ or $P(O)R^{19}$.

Metallocenes preferably used are rac-dimethylsilyl-bis-(1-indenyl)-zircondichloride, rac-dimethylgermyl-bis-(1-indenyl)-zircondichloride, rac-phenylmethylsilyl-bis-(1-indenyl)-zircondichloride, rac-phenylvinylsilyl-bis-(1-indenyl)-zircondichloride, 1-silycyclobutyl-bis-(1'-indenyl)-zircondichloride, rac-ethylene-bis-(1-indenyl)-zircondichloride, rac-diphenyl-bis-(1-indenyl)-hafniumdichloride, rac-phenylmethylsilyl-bis-(1-indenyl)-hafniumdichloride, rac-dimethylsilyl-bis-(1-indenyl)-hafniumdichloride, rac-diphenylsilyl-bis-(1-indenyl)-zircondichloride, diphenylmethylene-(9-fluoroenyl)-cyclopentadienyl-zircondichloride, isopropylene-(9-fluoroenyl)-cyclopentadienyl-zircondichloride, or their mixtures.

The cocatalyst is an aluminum oxane of formula VII for the linear type and/or of formula VIII for the cyclic type. In these formulas, $R^{13}$ means a $C_1$–$C_6$ alkyl group, preferably methyl, ethyl or isobutyl, butyl or neopentyl, or phenyl or benzyl. Methyl is preferred. N lower case is a whole number from 2 to 50, preferably 50 to 40. But the exact structure of the aluminum oxane is not known. The production of aluminum oxane is known from the literature. The concentration of aluminum oxane in the solution is in the range of about 1% by weight up to the saturation limit, preferably from 5–30% by weight in each case relative to the overall solution. The metallocene can be used in the same concentration, but preferably it is used in an amount of about $10^{-4}$-mol per mol of aluminum oxane.

The polymerization is performed in an inert solvent that is common for the Ziegler low pressure process, for example in an aliphatic or cycloaliphatic hydrocarbon; as such let butane, pentane, hexane, heptane, isooctane, cyclohexane, methylcyclohexane be named. Further, a gas or hydrogenated diesel oil fraction that has carefully had oxygen, sulfur compounds, and moisture removed can be used. Toluene can also be used.

Finally, the monomer to be polymerized can also be used as a solvent or as a suspending agent. In the case of norbornene, such material polymerizations are performed at a temperature above 45° C. The molecular weight of the polymerizate can be adjusted in a way known in the art; preferably, hydrogen is used for this.

The polymerization is performed in solution, suspension or in the gas phase continuously or discontinuously in one or more stages at a temperature of −78° C. to 150° C., preferably −20° C. to 80° C. The pressure is 0.5 to 64 bar and is maintained either by the gaseous olefins or with the help of inert gas.

Here the metallocene compound is used in a concentration, relative to the transition metal, of $10^{-3}$ to $10^{-7}$, preferably $10^{-5}$ to $10^{-6}$ mol of transition metal per dm³ of reactor volume. The aluminum oxane is used in a concentration of $10^{-4}$ to $10^{-1}$, preferably $10^{-4}$ to $2 \times 10^{-2}$ mol per dm³ of reactor volume, relative to the aluminum content. To combine the polymerization properties of various metallocenes, it is possible to use mixtures of several metallocenes.

In addition to mixtures of two or more cycloolefinic polymers, a plastic material according to the invention can also have other polymers. Blends can be produced in the melt or in solution. The blends in each case have a combination of properties of the components suitable for certain applications.

In doing this, the other polymers must be able to be mixed with the cycloolefinic polymers. Able to be mixed in the context of the invention in that, in mixing, no clouding occurs and the Abbe number of the mixture is not smaller than 40.

To these polymers there belong, among others,

Polymers that can be obtained by polymerization of hydrocarbons with 1 or 2 unsaturated bonds. To these belong, among others, polyolefins, such as, e.g., polyethylene, polypropylene, polyisobutylene, polymethylbutylene-1, polyisoprene and polystyrene;

Vinyl polymers containing halogen, such as, e.g., vinyl chloride, polyvinylidene chloride, polyvinyl fluoride, and polychloroprene;

Polymers that are derived from α, β-unsaturated carboxylic acids or their derivatives, such as, e.g., polyacrylate, polymethacrylate, polyacrylamide, and polyacrylonitrile;

Polymers that are derived from unsaturated alcohols, amines, acyl derivatives or acetalene such as, e.g., polyvinyl alcohol, polyvinyl acetate, polyvinyl stearate, polyvinyl benzoate, polyvinyl maleate, polyvinyl butyral, polyallyl phthalate, and polyallyl melamine;

Polymers that are derived from epoxidene, such as polyethylene oxide;

Polyacetals such as, e.g., polyoxymethylene, polyoxyethylene, and ethylene oxides containing polyoxymethylene;

Polyphenylene oxides;
Polycarbonates;
Polysulfones;
Polyurethanes and urethane resins;

Polyamides and copolyamides that are derived from diamines and dicarboxylic acids and/or aminocarboxylic acids, such as, e.g., Nylon 6, Nylon 66, Nylon 11 and Nylon 12; polyamide polyether;

Polyesters that are derived from dicarboxylic acids and dialcohols and/or hydroxycarboxylic acids or corresponding lactones such as, e.g., polyethylene terephthalate, polybutylene terephthalate and poly-1,4-dimethylolcyclohexane terephthalate.

The amounts in which these polymers can be mixed with the cycloolefinic polymers mentioned above is limited to the point at which no unallowable great clouding occurs. Without making it a limitation, the portion of cycloolefinic polymers in the plastic body is at least 50% by weight, preferably at least 80% by weight and most especially preferably more than 95% by weight relative to the total amount of the polymers.

By adding additional polymers, the refractive index can be changed. Further, in this way the processability and the durability of the lenses can be influenced.

Further, the plastics according to the invention can contain the usual additives. To these belong, among others, antistatic agents, antioxidants, mold release agents, lubricants, dyes, flow improvement agents, fillers, light stabilizers and organic phosphorous compounds, such as phosphites or phosphonates, pigments, weathering protectants and softeners.

The addition of these additives is limited, among other things, by the transparency necessary for ophthalmic applications.

Especially preferred additives are antioxidants. These compounds are well known to one skilled in the art. As examples for numerous suitable additives of this type let there be named:

Chloranil acid (2,5-dichloro-3,6-dihydroxy-1,4-benzoquinone, hydroquinone (1,4-dihydroxybenzene), Irganox 1330 (1,3,5-trimethyl-2,4,6-tris-(3,5-di-tert.butyl-4-hydroxybenzyl)benzene, Vulkanox BHT (2,6-di-tert.butyl-4-methylphenol), 4-tert-butylbenzcatechin, compounds of general formula X

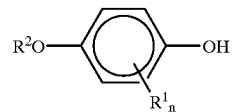

(X)

in which n is a whole number in the range between 1 to 4, $R^1$ means a substituted or unsubstituted, linear or branched alkyl radical with 1 to 8 carbon atoms, preferably with 1 to 4 carbon atoms, an aryl radical or halogen, preferably chlorine, fluorine or bromine, and $R^2$ is hydrogen or a substituted or unsubstituted, linear or branched alkyl radical with 1 to 8 carbon atoms, preferably with 1 to 4 carbons atoms. To these belong, among others, Irganox 1010 (3,5-bis(1,1-dimethylethyl-2,2-methylenebis-(4-methyl-6-tert-butyl)phenol), Irganox 1035 (2,2'-thiodiethylbis-(3-(3,5-di-tert-butyl-4-hydroxyphenyl)propionate), Irganox 1076 (octadecyl-3-(3,5-di-tert butyl-4-hydroxyphenyl) propionate, Topanol O, Cyanox 1790 (tris-(4-tert.butyl-3-hydroxy-2,6-dimethylbenzyl)-5-triazine-2-4-6-(1H, 3H, 5H)trione), Irganox 1098 and the like.

Plastics incorporating cycloolefinic homo-and copolymers that fulfill the above-mentioned requirements can furthermore be obtained commercially. Those commercially available are, e.g., ®Topas brands obtainable from Ticona, as well as ®Zeonor brands from Nippon Zeon.

The body of plastic can be produced from the above-mentioned polymers for example by casting processes and by injection molding. Here, injection molding processes are generally preferred because of their economy. These processes are widely known.

The ophthalmic lenses according to the invention have a transparent coating resistant to corrosion that incorporates two layers, one inner interface layer facing the plastic and one grease protection layer.

The interface layer serves especially to seal the porous structure of the cycloolefinic polymers, and an extremely smooth interface is obtained. As previously mentioned, the porosity of plastic bodies made of cycloolefinic polymers is responsible for the clouding that occurs from the effect of greases or solvents. This layer at least must be transparent.

An especially preferred embodiment of the interface layer has at least 5% by weight of carbon, especially preferably at least 10% by weight of carbon and most especially preferably at least 25% by weight of carbon, relative to the total weight of this layer. Especially preferred embodiments of lenses according to the invention have interface layers that are at least 500 nm thick, preferably more than 600 nm and most especially preferably more than 700 nm thick.

As the grease protection layer, according to the invention any material is suitable that has the required properties of transparency and resistance to greases and solvents.

Quite surprisingly it was determined that a layer with a carbon content <5%, in particular <3%, relative to the total weight of this layer, is especially well suited as the grease protection layer. The layer thickness of the grease protection layer is preferably at least 100 nm and most especially preferably more than 150 nm. This layer protects the plastic body and the inner layer lying under it in particular from clouding from the effect of grease, sweat and cleaning agents.

Both layers can lie directly against one another, and the transition from the interface layer to the grease protection layer can occur either abruptly, i.e., there are two layers, for example with different carbon content (stepwise function), or can occur continuously over the layer thickness as a "gradient," so that both different layers can be still better anchored to one another.

The gradient can occur, for example, with respect to the carbon content of the individual plies, and the former decreases from the plastic body outward. Consequently, the carbon content of both outer plies results in the two-layer construction of the barrier layer. With this layer construction, the previously mentioned, preferred nonlimiting values for the carbon content are valid for both outer plies of the continuously changing barrier layer.

In using the gradient layer, the layer thickness of the barrier layer can be slightly reduced compared to the abrupt transition.

Further, the coating can have other layers that are known to those skilled in the art. To these belong, among others, antireflective coatings, anti-fog coatings, and antiscratch coatings.

The coating of lenses according to the invention that incorporate at least one interface layer and a grease protection layer can be performed in any way known in the art so long as it fulfills the requirements described above.

Especially suited are, in particular, so-called CVD (chemical vapor deposition) processes, among which so-called plasma processes are preferred. In them, generally at reduced pressure, a coating is produced by irradiating a decomposable gas. The irradiation can be performed continuously or pulsed, and the latter process, also called PPCVD (plasma pulse CVD) is especially suitable.

The PPCVD process is described, e.g., in the Journal of the Ceramic Society of Japan, 99 (10), 894–902 (1991), and the coating of curved surfaces is disclosed (see WO 95/26427).

In the PPCVD process, the electromagnetic radiation that excites the plasma is generally supplied in a pulsed way, while the coating gas flows continuously, and at each pulse a thin layer (typically about 1 nm, monoply range) precipitates on the substrate. After each working pulse, there is a pulse pause so that high coating speeds are possible without noticeable temperature stress on the substrate. The height and duration of the work pulse and the duration of the pulse pause are decisive for the production of a layer. The pulse height is a measure of performance in a PPCVD process. It corresponds to the pulse performance, i.e., the product of the generator voltage and the generator current during the pulse duration. The part of the performance that is actually coupled into the plasma depends on a series of parameters, e.g., the size of the component emitting the pulse and the reactor.

Depending on the pulse height,
a) starting at a threshold value that is characteristic for every gas, varying excitations and reactions are generated in the plasma,
b) varying thicknesses are established in the plasma zone.

Use of the PPCVD process makes it possible to precipitate, from pulse to pulse, by corresponding choice of the pulse height, purposeful, ply-wise elementary layers (monoplies) of varying composition. This is done in particular by a suitable choice of the pulse pause, so that always the same gas composition is present at each pulse, e.g., by a clean separation of the exhaust gas and the make-up gas. This is not possible with the usual PCVD process.

The following ranges of performance parameters are especially preferred:
Pulse duration: 0.01 to 10 milliseconds, in particular 0.1 and 2 milliseconds;
Pulse pause: 1 to 1000 milliseconds, in particular 5 to 500 milliseconds; and
Pulse height: 10 to 100,000 watts.

The PPCVD process is performed with alternating voltage pulses of a frequency between 50 kHz and 300 gigahertz, and frequencies of about 2.45 gigahertz are especially preferred. Usually coating is done at a pressure in the range of 0.001 to about 10 millibars, preferably 0.1 to 2 millibars.

Vaporizable compounds from which, when irradiated, organic polymers such as, e.g., polyethylene, polybutylene, polypropylene, parylene and polystyrene can be obtained, have proven to be especially suitable materials for the production of the interface layer. Thus, e.g., irradiation of paracyclophane produces a parylene film.

To produce the grease protection layer, volatile substances are especially suited which, e.g., when oxygen, nitrogen or gases are added that split off oxygen or nitrogen when irradiated, form inorganic layers, such as oxides, nitrides, and/or oxide-nitride compounds of silicon, titanium, aluminum, tin and tantalum, without these being limiting.

But most especially preferred are gases or gas mixtures that are able to form both an interface layer and a grease protection layer. To these belong, among others, hexamethylsiloxane (HMDSO), hexamethylsilazane (HMDS), tetraethoxysilane (TEOS), tetramethoxysilane, tetramethylsilane, tetraisopropyl orthotitanate (TIPT), or trimethylaluminum, and these substances can be mixed with oxygen to form a grease-resistant layer. These substances contain, in addition to alkyl- or alkoxy radicals, also metal or semimetal atoms that are able to form grease-resistant oxide layers. If, for example, a mixture of oxygen and hexamethyldisiloxane is used for coating, then by changing the performance parameters of the plasma process, layers can be produced that range from pure silicone resin layers to pure $SO_2$ layers.

The flow speed of the gas is selected for the PPCVD process generally so that, during the pulse, the gas can be considered as resting. Consequently the mass flows generally lie in the range of 1 to 200 standard-$cm^3$/minute, preferably in the range of 5–100 standard-$cm^3$/minute.

The transparency of plastic lenses according to the invention is indicated by especially low clouding values, as they can be determined according to ASTM D 1003.

Further, the lenses are resistant to corrosion, in particular from greases, sweat and/or solvents, as they are used for example to clean eyeglass lenses. This can be determined, for example, by putting the optical lenses in cyclohexane for about 30 minutes.

These properties of the lens make it possible for the lenses to be used in applications in which they are exposed to high stresses from solvents, as is the case, e.g., with eyeglasses.

The plastic lenses can further be tinted to obtain sunglasses, for example.

The plastic lenses according to the invention preferably have a refractive index greater than 1.49, in particular greater than 1.52.

The Abbe number of the lenses is preferably greater than 40, especially preferably greater than 50 and most especially preferably greater than 55.

The Abbe number is used to characterize the dispersion of an optical medium. It is calculated from $$V_D = (n_E - 1)/(n_F - n_c),$$

where $n_E$, $n_F$, and $n_c$ are the refractive indices of the medium at the Fraunhofer E, F, and C lines. Here, E is the green Hg line with $\lambda = 546.1$ nm, F is the blue cadmium line with $\lambda = 643.8$ nm and C is the red cadmium line $\lambda = 480.0$ nm. A large Abbe number means a low dispersion.

The density of the coated plastic lens is generally less than 1.5 g/cm$^3$, preferably less than 1.3 g/cm$^3$, and especially preferably less than 1.1 g/cm$^3$, without the above-mentioned technical indications, such as the Abbe number or the refractive index, being limiting.

The following examples and comparative examples serve the detailed description of this invention in a nonlimiting way.

EXAMPLE 1

A lens was produced by injection molding from ®Topas 5013 from Ticona GmbH, Frankfurt. This substrate was provided by PPCVD with two layers. The following parameters were used:
Frequency: 2.54 GHz
Pulse pause: 90 ms
Pulse duration: 1 ms
Pulse height: 45% of the maximal value of a 6 kW magnetron
Process pressure: 0.3 mbar
Substrate temperature: 30° C.
The first layer (interface layer) was obtained at an O$_2$ mass flow of 100 standard-cm$^3$/min and an HMDS'mass flow of 30 standard-cm$^3$/min. A layer thickness of 600 nm was produced.

The second layer (grease protection layer) was obtained at an O$_2$ mass flow of 100 standard-cm$^3$/min and an HMDSO mass flow of 10 standard-cm$^3$/min. A layer thickness of 300 nm was produced.

The substrate obtained this way was then tested for corrosion resistance with cyclohexane. For this purpose, the lens was put in a beaker filled with cyclohexane. The lens was removed and dried after 30 minutes.

The clouding was determined by visually comparing the coated lens with an uncoated lens. To do this, the lens was examined in front of a piece of white paper with the aid of a lamp. Further, the coated lens did not show any interference bands either, as was determined with a Waldmann lamp.

It turned out that the coated lens showed no clouding even after the effect of hexane.

Comparative Example 1

A lens produced from ®Topas 5013 was coated with lacquer by dipping it into a commercially available mixture. The coating had a thickness of about 1 μm.

It was determined that the substrate is indeed grease-resistant but the transparency of the material does not fulfill the requirements, since the lens coated with the dipping process shows heavy clouding in the visual comparison with the uncoated material.

Comparative Example 2

A lens produced from ®Topas 5013 was silanized with reactive silicone, and a layer thickness of about 10 μm was obtained. The substrate obtained this way showed recognizable clouding and is thus not suited for production of eyeglass lenses.

Comparative Example 3

A lens produced from ®Topas 5013 was metallized with silver, and the layer thickness was 400 nm. It was determined that the substrate is indeed grease resistant, but the transparency of the material does not fulfill the requirements.

Comparative Example 4

A lens produced from ®Topas 5013 was metallized with gold, and the layer thickness was 400 nm. It was determined that the substrate was indeed grease resistant but the transparency of the material does not fulfill the requirements.

EXAMPLE 2

A lens produced from ®Topas 5013 was coated with a plasma CVD process and, in contrast with example 1, the work was performed not in a pulsed way but continuously by irradiation with a frequency of 13.56 MHz. The power used was selected so that it corresponded to the power used in example 1. The remaining parameters, such as pressure, temperature and mass flow of the gas corresponded to the values selected in example 1, and two layers, i.e., a 600-nm thick interface layer and a 300 nm thick grease protection layer were produced.

The substrate produced this way was then tested for corrosion resistance with cyclohexane.

It turned out that the substrate suited for the production of lenses showed no clouding even after 30 minutes of subjection to hexane.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing, all temperatures are set forth uncorrected in degrees Celsius; and, unless otherwise indicated, all parts and percentages are by weight.

The entire disclosure of all applications, patents and publications, cited above, and of corresponding German application No. 199 288 88.7-51, filed Jun. 24, 1999 is hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An optical lens with a body made of plastic wherein the plastic incorporates cycloolefinic polymers and the plastic body is coated with a transparent coating resistant to corrosion that has at least two layers, one inner interface layer facing the plastic and a grease protection layer.

2. A lens according to claim 1, wherein the interface layer has at least 5% by weight of carbon.

3. A lens according to claim 1, wherein the interface layer has a thickness of at least 500 nm.

4. A lens according to claim 2, wherein the grease protection layer has a carbon content less than 5% by weight.

5. A lens according to claim 1, wherein the grease protection layer has a thickness of at least 100 nm.

6. A lens according to claim 1, wherein the refractive index is greater than 1.49.

7. A lens according to claim 1, wherein the Abbe number is greater than 50.

8. A process for the preparation of a lens according to claim 1, wherein a plastic body incorporating cycloolefinic polymers is coated with a transparent coating which is resistant to corrosion.

9. A process according to claim 8, wherein the coating is applied by plasma-CVD processes.

10. A process according to claim 8, wherein the coating is applied by plasma pulse CVD processes.

11. A spectacle glass comprising an optical lens of claim 1.

12. A lens according to claim 1, wherein the refractive index is greater than 1.52.

13. An ophthalmic lens comprising an optical lens of claim 1.

14. An optical device comprising an optical lens of claim 1.

15. An optical device of claim 14 which is an objective or a camera.

16. A lens according to claim 1, wherein the Abbe number is greater than 40.

17. A lens according to claim 1, wherein the cycloolefinic polymers in the plastic body is at least 50% by weight relative to the total amount of polymers.

18. A lens according to claim 1, wherein the cycloolefinic polymers in the plastic body is at least 95% by weight relative to the total amount of polymers.

19. A lens according to claim 1, wherein the density of the coated plastic lens is less than 1.5 g/cm³.

20. A lens according to claim 1, wherein the interface layer has at least 25% by weight of carbon.

21. A lens according to claim 1 wherein the cycloolefinic polymers are prepared from optionally bridged polycyclic olefins, monocyclic olefins, or cycloalkanes with olefinic side chains.

22. A lens according to claim 1 wherein the cycloolefinic polymers comprise one or more of a polymerized polycyclic olefin of formula I, II, III or IV or a polymerized monocyclic olefin of formula V, or a polymerized acyclic 1-olefin of formula VI,

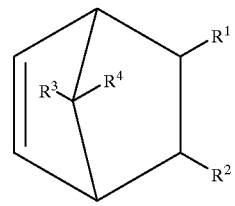
(I)

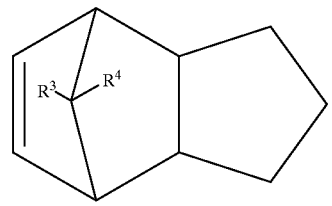
(II)

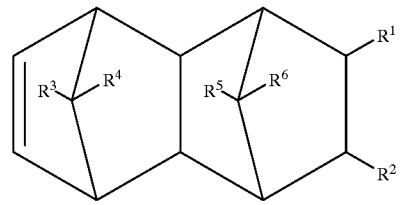
(III)

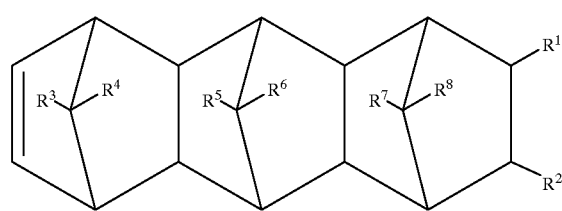
(IV)

(V)

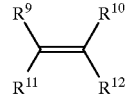
(VI)

wherein
$R^1$, $R^2$, $R^3$, $R^4$, $R^5$, $R^6$, $R^7$, $R^8$, $R^9$, $R^{10}$, $R^{11}$, and $R^{12}$ independently of one another are hydrogen or an alkyl radical having 1–8 carbon atoms, and
n is a number from 2–10.

23. A lens according to claim 1 wherein the interface layer comprises polyethylene, polybutylene, polypropylene, parylene or polystyrene.

24. A lens according to claim 1 wherein the grease protection layer comprises hexamethylsiloxane, hexamethylsilazane, tetraethoxysilane, tetramethoxysilane, tetramethylsilane, tetraisopropyl, orthotitanate, or trimethylaluminum.

25. A lens according to claim 1 wherein the plastic body further comprises polymers which are not cycloolefinic polymers.

26. A lens according to claim 1 further comprising one or more of antireflective coating, anti-fog coating or anti-scratch coating layers independently of each other.

* * * * *

UNITED STATES PATENT AND TRADEMARK OFFICE
CERTIFICATE OF CORRECTION

PATENT NO. : 6,379,001 B1
DATED : April 30, 2002
INVENTOR(S) : Tomida et al.

It is certified that error appears in the above-identified patent and that said Letters Patent is hereby corrected as shown below:

Column 1,
Line 23, "almost" should read -- mostly --.

Column 3,
Line 10, "of the" should be deleted; and
Line 39, "visibleness" should read -- visibility --.

Column 4,
Line 5, "632095" should read -- 6-32095 --.

Column 5,
Line 25, "opalescence" should read -- opalescent --.

Column 10,
Line 24, "of' should be deleted.

Column 12,
Line 15, "NFA37ON" should read -- NSA370N --.

Column 13,
Line 48, "Colo.)," should read -- Co.), --.

Column 16,
Line 15, "water-soluble" should read -- water-soluble resin --.

Column 18,
Line 19, "largely" should read -- much --.

Column 20,
Line 7, "$SP_c$" should read -- $SP_c|$ --.

Column 22,
Line 2, "standing-bystate" should read -- standing-by state --.

Column 23,
Line 31, "to" should read --from --.

Column 26,
Line 58, "was" should read -- were --.

Column 27,
Line 3, was" should read -- were --.

UNITED STATES PATENT AND TRADEMARK OFFICE
CERTIFICATE OF CORRECTION

PATENT NO. : 6,379,001 B1
DATED : April 30, 2002
INVENTOR(S) : Tomida et al.

It is certified that error appears in the above-identified patent and that said Letters Patent is hereby corrected as shown below:

Signed and Sealed this

Twenty-eighth Day of January, 2003

JAMES E. ROGAN
*Director of the United States Patent and Trademark Office*